US008638928B2

(12) United States Patent
Furukawa et al.

(10) Patent No.: US 8,638,928 B2
(45) Date of Patent: Jan. 28, 2014

(54) KEY EXCHANGING APPARATUS

(75) Inventors: Jun Furukawa, Tokyo (JP); Frederik Armknecht, Heidelberg (DE); Joao Girao, Heidelberg (DE)

(73) Assignee: NEC Corporation, Tokyo (JP)

( * ) Notice: Subject to any disclaimer, the term of this patent is extended or adjusted under 35 U.S.C. 154(b) by 1046 days.

(21) Appl. No.: 12/602,057

(22) PCT Filed: Apr. 17, 2008

(86) PCT No.: PCT/JP2008/057507
§ 371 (c)(1),
(2), (4) Date: Nov. 25, 2009

(87) PCT Pub. No.: WO2008/146547
PCT Pub. Date: Dec. 4, 2008

(65) Prior Publication Data
US 2010/0180119 A1        Jul. 15, 2010

(30) Foreign Application Priority Data

May 25, 2007    (JP) ................................. 2007-138940

(51) Int. Cl.
*H04L 9/00*    (2006.01)
*H03B 29/00*    (2006.01)

(52) U.S. Cl.
USPC ............................................. 380/44; 331/78

(58) Field of Classification Search
USPC ............................................. 380/44; 331/78
See application file for complete search history.

(56) References Cited

U.S. PATENT DOCUMENTS

| 7,650,494 | B2* | 1/2010 | Chen et al. ............. | 713/155 |
| 2005/0246533 | A1* | 11/2005 | Gentry ............. | 713/170 |
| 2007/0162750 | A1* | 7/2007 | Konig et al. ............. | 713/168 |

FOREIGN PATENT DOCUMENTS

| JP | 08-204700 | 8/1996 |
| JP | 2002-026892 | 1/2002 |
| JP | 2004-280401 | 10/2004 |
| JP | 2006-171711 | 6/2006 |
| JP | 2006-203660 | 8/2006 |

OTHER PUBLICATIONS

International Search Report, PCT/JP2008/057507, May 27, 2008.
Mike Burmester et al., "A Secure and Efficient Conference key Distribution System", Advances in Cryptology-EuroCrypt '94 Lecture Notes in Computer Science Springer-Verlag, vol. 1440, 1999, p. 275-p. 286.

(Continued)

*Primary Examiner* — Ashok Patel
*Assistant Examiner* — Lawrence Cosby
(74) *Attorney, Agent, or Firm* — Young & Thompson

(57) ABSTRACT

A key exchanging apparatus transmits the contribution data to the plurality of counterpart apparatuses, generates a signer contribution confirmation signature with respect to a contribution data set including all the contribution data received from the plurality of counterpart apparatuses, generates auxiliary data and auxiliary data validity certification sentence from the contribution data set and the contribution random number, transmits the auxiliary data, the auxiliary data validity certification sentence and the contribution confirmation signature to the plurality of counterpart apparatuses, verifies validity of auxiliary data by using the counterpart identifier set, the counterpart public key set, the contribution confirmation signature set including the data received from the plurality of counterpart apparatuses, the auxiliary data set and the auxiliary data validity certification sentence set, and generates a public key from the contribution data set and the auxiliary data received from the plurality of counterpart apparatuses.

6 Claims, 3 Drawing Sheets

(56) References Cited

OTHER PUBLICATIONS

Tatsuaki Okamoto et al., "Ango Zero Chishiki Shomei Suron", Kyoritsu Shuppan Co., Ltd., Jun. 1, 1995, pp. 45 to 46.

Jonathan Katz, Ji Sun Shin: Modeling insiders attacks on group key-exchange protocols. ACM Conference on Computer and Communications Security 2005: 180-189.

* cited by examiner

KEY EXCHANGING APPARATUS

FIELD OF THE INVENTION

The present invention relates to a key exchanging apparatus and a key exchanging method capable of exchanging the same key through communications.

DESCRIPTION OF THE PRIOR ART

A group key exchanging apparatus is disclosed in "Jonathan Katz, Ji Sun Shin: Modeling insider attacks on group key-exchange protocols. ACM Conference on Computer and Communications Security 2005:180-189".

A method disclosed in the above document will now be described.

First, it shows a notation. p is a prime number, $G_T$ is a cyclic group of order q. The number of apparatuses for exchanging a key is n, and a number i is attached to each apparatus. An identifier indicating an apparatus i is U[i]. G is a constructor of $G_T$. v and w are randomly selected integers. F and F' are pseudo-random number generating apparatuses.

FIG. 1 shows a key exchanging apparatus.

As shown in FIG. 1, a group exchanging apparatus according to the present exemplary embodiment includes verification data verifying unit 311, verification data generating unit 312, temporary key generating unit 313, auxiliary data generating unit 314, contribution random number generating unit 315, contribution data generating unit 316, and communication unit 317.

Thus configured key exchanging apparatus 300($i$) receives counterpart identifier set 301, i.e., a set of identifiers corresponding to each apparatus j of j={1, ..., n}¥i, and counterpart public key set 302, i.e., a set of public keys pk[j]. Also, secret key 305 (sk[i]) corresponding to public key 304 (pk[i]) and identifier 303 (U[i]) is inputted to the key exchanging apparatus. In addition, key-specific session number 306 (sid) generated from it is also inputted to the key exchanging apparatus.

In key exchanging apparatus 300($i$), contribution random number generating unit 315 randomly generates a contribution random number 324 (r[i]∈Z/qZ) by using input random number 307.

Contribution data generating unit 316 generates contribution data 325 ($y[i]=g^{r[i]}$) by using 324 (r[i]∈Z/qZ), and also generates signature sign(i, 1) with respect to sid, 1, U[i], y[i]. Contribution data generating unit 316 transmits (sid, 1, U[i], y[i], sig(i, 1)) to the (n−1) number of apparatuses from communication unit 317.

In key exchanging apparatus 300($i$), regarding j={1, ..., n}¥i, communication unit 317 waits for the apparatus j to receive the contribution data y[j] via communication line 309.

When contribution data set 323 including all contribution data y[j] is formed, key exchanging apparatus 300($i$) verifies each signature.

Auxiliary data generating unit 314 generates auxiliary data 322 ($x[i]=(y[i+1]/y[i-1])^{r[i]}$) by using contribution data set 323, and generates signature sig(i,2) with respect to (sid, 2, U[i], x[i]).

Communication unit 317 transmits (sid, 2, U[i], x[i], sig(i, 2)) to the other (n−1) number of apparatuses.

When every x[j] is received via communication unit 317, forming data set 321 including every x[j], key exchanging apparatus 300($i$) verifies each signature.

Next, temporary key generating unit 313 generates $k[i]=(y[i+1]^{r[i]})^n x[i+1]^{n-1} x[i+2]^{n-2} \ldots x[n]^i x[1]^{i-1} \ldots x[i-1]$.

Thereafter, verification data generating unit 312 generates ack[i]=F(k[i], v), and temporary key generating unit 313 generates public key 308 (sk[i]=F'(k[i], w)). Also, it generates a signature sign(i, 3) with respect to (sid[i], 3, U[i], ack[i]).

Communication unit 317 transmits (sid, 3, U[i], ack[i], sig(i, 3)) to the other (n−1) number of apparatuses.

Every ack[j] is received via communication unit 317, and when the ack[j] are all set, verification data verifying unit 311 of key exchanging apparatus 300($i$) verifies each signature.

When verification data verifying unit 311 verifies ack[j]=ack[i] with respect to every j={1, ..., n}¥i, temporary key generating unit 313 outputs public key 308 (sk[i]).

In the above-described technique, when the public key is exchanged, each apparatus needs to distribute data to all of other apparatuses three times. Until every apparatus completes their distribution of data to other apparatuses, each apparatus cannot perform the next step, so the amount of time required for data distribution is significantly lengthened compared to the amount of time required for calculating each data item. Here, much time is taken to process of matching synchronization in communications, making it difficult to terminate communication within a short time compared with a simple code calculation. Thus, in order to quickly perform key exchanging among the plurality of apparatuses, the number of data distributions needs to be reduced.

SUMMARY OF THE INVENTION

An object of the present invention is to provide a key exchanging apparatus capable of quickly exchanging a key among a plurality of apparatuses.

To achieve the above object, there is provided a key exchanging apparatus which receives a public key, a secret key, an identifier, a counterpart public key set, a counterpart identifier set, a session number, and a random number inputted thereto, performs communication with a plurality of counterpart apparatuses identified by identifiers belonging to the counterpart identifier set, and generates and outputs a public key, including a contribution random number generating unit that generates a contribution random number by using the random number; a contribution data generating unit that generates contribution data from the contribution random number generated by the contribution random number generating unit; a communication unit that transmits the contribution data to the plurality of counterpart apparatuses, a signing unit that generates a signer contribution confirmation signature with respect to a contribution data set including all contribution data received by the communication unit from the plurality of counterpart apparatuses by using the secret key and the public key; a verifiable auxiliary data generating unit that generates auxiliary data and an auxiliary data validity certification sentence by the contribution data set and the contribution random number, the auxiliary data, the auxiliary data validity the certification sentence and the contribution confirmation signature being transmitted to the plurality of counterpart apparatuses by the communication unit; a validity verifying unit that verifies validity of the auxiliary data by using the counterpart identifier set and the counterpart public key set, and the contribution confirmation signature set, the auxiliary data set and the auxiliary data validity certification sentence including data received by the communication unit from the plurality of counterpart apparatuses; and a key generating unit that generates the public key from the contribution data set and the auxiliary data that are received by the communication unit from the plurality of counterpart apparatuses.

According to the invention, with such a configuration as described above, when a secret key is shared among a plurality of apparatuses, the number of data distribution items by the apparatuses is merely two times, smaller by one time than the related art, so a key can be more quickly exchanged.

DETAILED DESCRIPTION OF THE PREFERRED EMBODIMENTS

Exemplary embodiments of the present invention will now be described with reference to the accompanying drawings.

Notation Used in Exemplary Embodiments p is prime number, G and $G_T$ are a circular group of an order p, and e is a bilinear mapping non-degenerative from G×G to $G_T$. Here, the bilinearity refers to the face that $e(g^\alpha, g^\beta) = e(g, g)^{\alpha\beta}$ is established for every $\alpha, \beta \in Z/qZ$ and $g \in G$. In addition, non-degeneration refers to the fact that when g is a generator of G, $e(g,g)$ becomes a generator of $G_T$.

The number of key exchanging apparatuses is n, and number i is attached to each apparatus. An identifier indicating the apparatus i is U[i]. g and h are generators of G.

First Exemplary Embodiment

Figure 1:
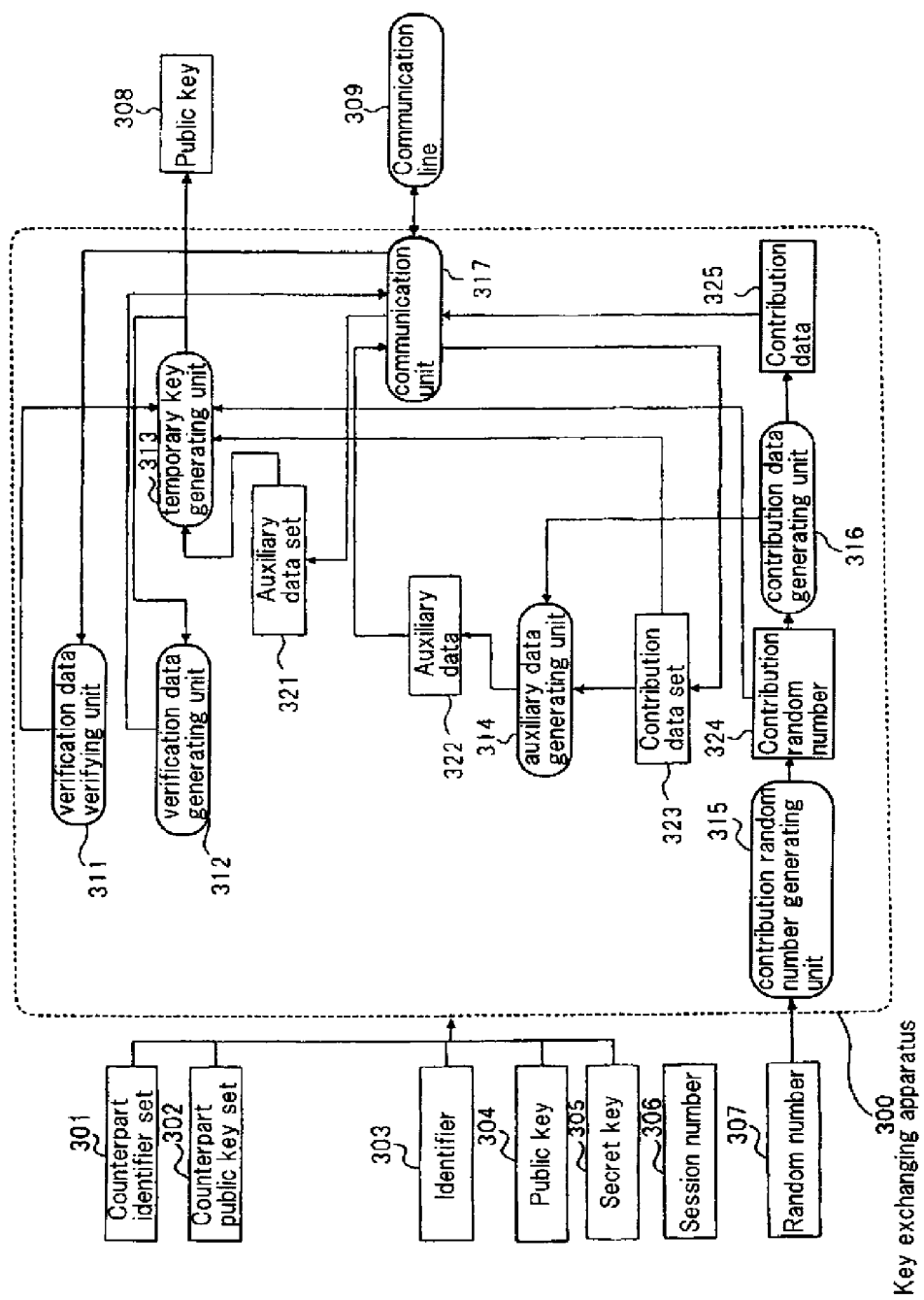
FIG. 1 illustrates an example of a key exchanging apparatus.
Figure 2:
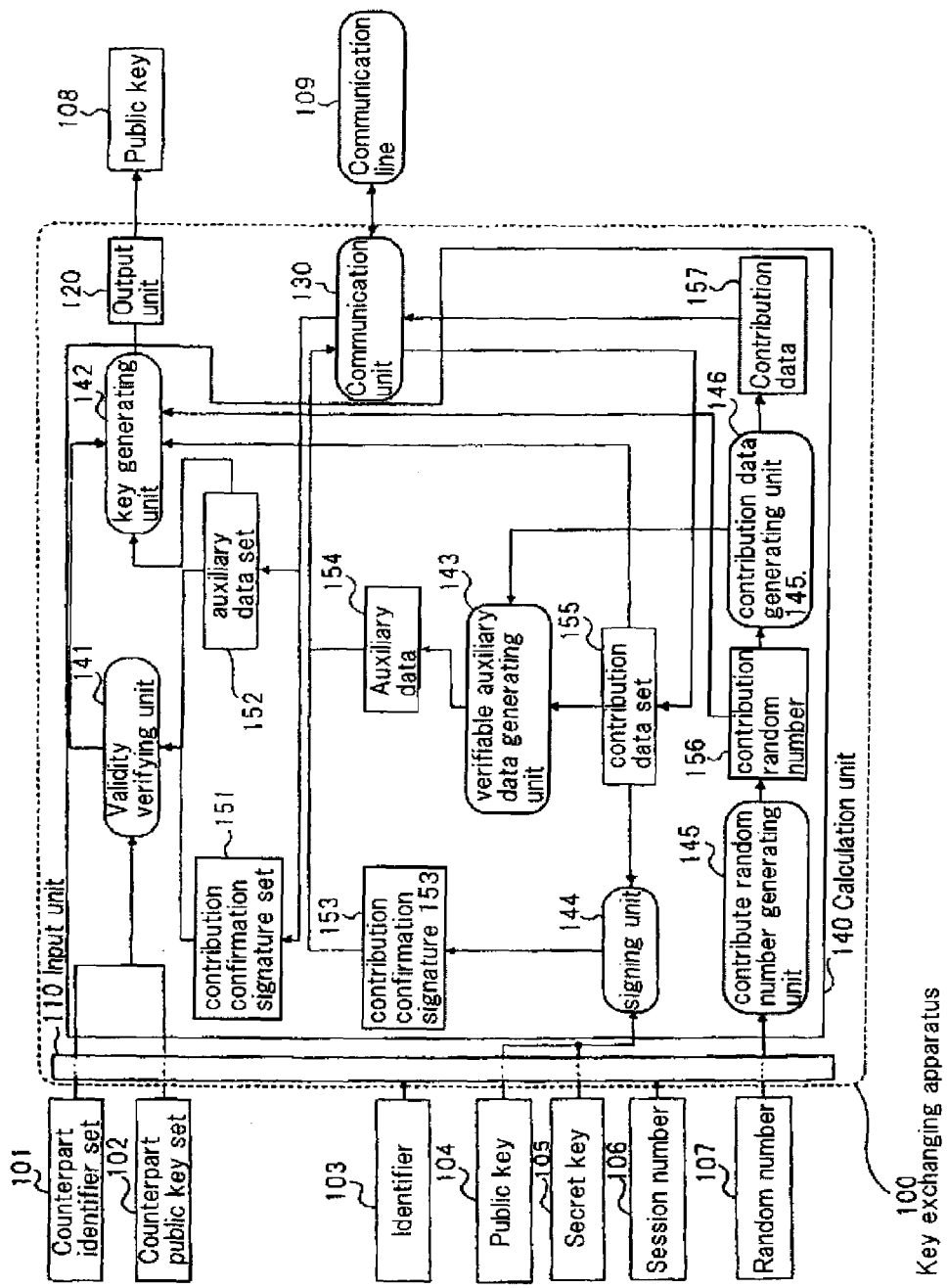
FIG. 2 illustrates a key exchanging apparatus according to a first exemplary embodiment of the present invention.

FIG. 2 shows a key exchanging apparatus according to a first exemplary embodiment of the present invention.

As shown in FIG. 2, the key exchanging apparatus according to the first exemplary embodiment of the present invention includes input unit 110, calculation unit 140, output unit 120, and communication unit 130. The calculation unit 140 includes validity verifying unit 141, key generating unit 142, verifiable auxiliary data generating unit 143, signing unit 144, contribute random number generating unit 145, and contribution data generating unit 146.

Input unit 110 receives counterpart identifier set 101, counterpart public key set 102, identifier 103, pubic key 104, secret key 105, session number 106, and random number 107.

Calculation unit 140 is means for calculating two groups G and $G_T$ the orders of which are identical to each other and in which there is bilinear mapping from two elements belonging to the group G to the group $G_T$. Calculation unit 140 generates public key 108 by using counterpart identifier set 101, counterpart public key set 102, identifier 103, public key 104, secret key 105, session number 106, and random number 107 inputted via input unit 110, and data received by communication unit 130.

Output unit 120 outputs public key 108 generated by calculation unit 140.

Contribution random number generating unit 145 generates contribute random number 156, a random number for generating contribution data 157, by using random number 107 inputted via input unit 110.

Contribution data generating unit 146 generates contribution data 157 from contribution random number 156 generated by contribution random number generating unit 145.

Signing unit 144 generates contribution confirmation signature 153 used as a signature for contribution data set 155 including all the contribution data received from all counterpart apparatus, by using secret key 105 and public key 104 inputted via input unit 110.

Verifiable auxiliary data generating unit 143 generates auxiliary data 154 from contribution data set 155 and contribution random number 156.

Validity verifying unit 141 verifies validity of auxiliary data by using counterpart identifier set 101 and counterpart public key set 102 inputted via the input unit 110, contribution confirmation signature set 151 and auxiliary data set 152 including data received from each counterpart apparatus via communication unit 130.

Key generating unit 142 generates public key 108 from contribution data set 155 and auxiliary data set 152 received from each counterpart apparatus via communication unit 130.

Communication unit 130, configured to exchange data with a counterpart apparatus via communication line 109, transmits contribution data 157 generated by contribution data generating unit 146, auxiliary data 154 generated by verifiable auxiliary data generating unit 143, and contribution confirmation signature 153 generated by signing unit 144 to each counterpart apparatus via communication line 109.

The operation of key exchanging apparatus 100 configured as described above will now be described.

Counterpart identifier set 101, a set of identifiers U[j] corresponding to each apparatus j of j={1, ..., n}≠i, and a counterpart public key set, a set of public key pk[j] corresponding to each apparatus j of j={1, ..., n}≠i, are inputted to each key exchanging apparatus 100(i) via input unit 110. In addition, identifier 103 corresponding to its own apparatus, its public key 104 (pk[i]), and secret key 105 (sk[i]) corresponding to public key 104 (pk[i]) are also inputted to each key exchanging apparatus 100(i) via input unit 110. Also, public key 108-specific session number 106 (sid) generated therefrom and random number 107 are inputted to each key exchanging apparatus 100(i) via input unit 110.

In key exchanging apparatus 100(i), first, contribution random number generating unit 145 randomly generates 156 (r[i] ∈Z/qZ), a contribution random number for generating contribution data 157, by using random number 107 inputted via input unit 110.

Next, contribution data generating unit 146 generates contribution data 157 ($y[i]=g^{r[i]}$) from contribution random number 156 generated by contribution random number generating unit 145, and transmits contribution data 157 ($y[i]=g^{r[i]}$) to the other (n−1) number of apparatuses via communication unit 130.

Regarding j={1, ..., n}≠i, key exchanging apparatus 100(i) waits for receiving contribution data y[j] from apparatus j by communication unit 130.

When contribution data y[j] is received by communication unit 130 from each apparatus, forming contribution data set 155 including all the contribution data y[j], verifiable auxiliary data generating unit 143 generates auxiliary data 154 ($x[i]=(y[i+1]/y[i-1])^{r[i]}$) via contribution data set 155 and contribution random number 145, and signing unit 144 generates signer contribution confirmation signature 153 (sig) with respect to contribution data set 155 (sid, y[1], ..., y[n]) including all the contribution data received from each counterpart apparatus by using secret key 105 and public key 104 inputted via input unit 110.

Communication unit 130 transmits (sid, x[i], sig) to the other (n−1) number of apparatuses.

When auxiliary data x[j] is received by communication unit 130 from each apparatus, forming auxiliary data set 152 including all auxiliary data x[j], validity verifying unit 141 verifies each signature of contribution confirmation signature set 151 by using counterpart identifier set 101 and counterpart public key set 102 inputted via input unit 110, contribution confirmation signature set 151 and auxiliary data set 152 including data received, by communication unit 130, which has been transferred from a different apparatus.

Next, key generating unit 142 generates $k[i]=(y[i-1]^{r[i]})^n x[i]^{n-1} x[i+1]^{n-2} \ldots x[n]^{i-1} x[1]^{i-2} x[2]^{i-3} \ldots x[i-2]$ from candidate data set 155 and auxiliary set 152 received by communication unit 130 from each counterpart apparatus.

Validity verifying unit 141 checks whether or not $e(k[i], g)=e(y[n], y[1]\Pi_j^{n-1} e(y[j], y[j+1]))$ has been established. If $e(k[i], g)=e(y[n], y[1]\Pi_j^{n-1} e(y[j], y[j+1]))$ has been established, public key 108 ($ak[i]=e(k[i], v)$) is outputted from key generating unit 142 via output unit 120.

Second Exemplary Embodiment

This exemplary embodiment is different from the first exemplary embodiment in that there is no bilinear mapping.

Figure 3:
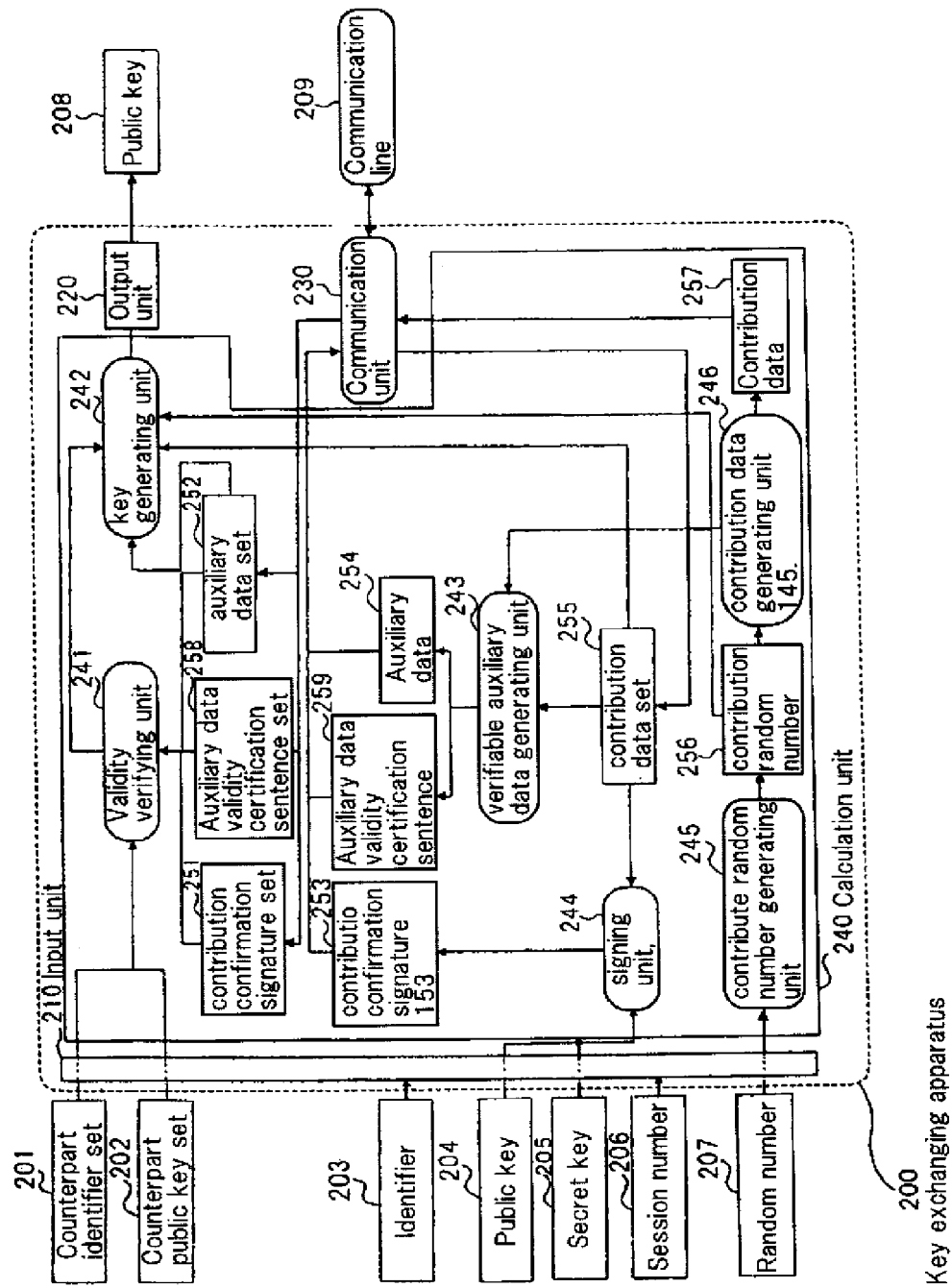
FIG. 3 illustrates a key exchanging apparatus according to a second exemplary embodiment of the present invention.

FIG. 3 illustrates a key exchanging apparatus according to a second exemplary embodiment of the present invention.

As shown in FIG. 3, the key exchanging apparatus according to the second exemplary embodiment includes input unit 210, calculation unit 240, output unit 220, and communication unit 230. Calculation unit 240 includes validity verifying unit 241, key generating unit 242, verifiable auxiliary data generating unit 243, signing unit 244, contribution random number generating unit 245, and contribution data generating unit 246.

Input unit 210 receives counterpart identifier set 201, counterpart public key set 202, identifier 203, pubic key 204, secret key 205, session number 206, and random number 207.

Calculation unit 240 generates public key 208 by using counterpart identifier set 201, counterpart public key set 202, identifier 203, public key 204, secret key 205, session number 206, and random number 207 inputted via input unit 210, and data received by communication unit 230.

Output unit 220 outputs public key 208 generated by calculation unit 240.

Contribution random number generating unit 245 generates contribute random number 256, a random number for generating contribution data 257, by using random number 207 inputted via input unit 210.

Contribution data generating unit 246 generates contribution data 257 from contribution random number 256 generated by contribution random number generating unit 245.

Signing unit 244 generates contribution confirmation signature 253 used as a signature for contribution data set 255 including all the contribution data received from each counterpart apparatus, by using secret key 205 and public key 204 inputted via input unit 210.

Verifiable auxiliary data generating unit 243 generates auxiliary data 254 from contribution data set 255 and contribution random number 256.

Validity verifying unit 241 verifies validity of auxiliary data by using counterpart identifier set 201 and counterpart public key set 202 inputted via input unit 210, contribution confirmation signature set 251 including data received from each counterpart apparatus via communication unit 230, auxiliary data set 252 and auxiliary data validity certification sentence set 258.

Key generating unit 242 generates public key 208 from contribution data set 255 and auxiliary data set 252 received from every counterpart apparatus via communication unit 230.

Communication unit 230, configured to exchange data with a counterpart apparatus via communication line 209, transmits contribution data 257 generated by contribution data generating unit 246, auxiliary data 254 and auxiliary data validity certification sentence 259 generated by verifiable auxiliary data generating unit 243, and contribution confirmation signature 253 generated by signing unit 244, to each counterpart apparatus via communication line 209.

The operation of key exchanging apparatus 200 configured as described above will now be explained.

Counterpart identifier set 201, a set of identifiers U[j] corresponding to each apparatus j of $j=\{1, \ldots, n\}\yen i$, and a counterpart public key set, a set of public key pk[j] corresponding to each apparatus j of $j=\{1, \ldots, n\}\yen i$, are inputted to each key exchanging apparatus 200(i) via input unit 210. In addition, identifier 203 corresponding to its own apparatus, its public key 204 (pk[i]), and secret key 205 (sk[i]) corresponding to public key 204 (pk[i]) are also inputted to each key exchanging apparatus 200(i) via input unit 210. Also, public key 208-specific session number 206 (sid) generated therefrom and random number 207 are inputted to each key exchanging apparatus 200(i) via input unit 210.

In key exchanging apparatus 200(i), first, contribution random number generating unit 245 randomly generates 256 ($r[i] \in Z/qZ$), a contribution random number for generating contribution data 257, by using random number 207 inputted via input unit 210.

Next, contribution data generating unit 246 generates contribution data 257 ($y[i]=g^{r[i]}$) from contribution random number 256 generated by contribution random number generating unit 245, and transmits contribution data 257 ($y[i]=g^{r[i]}$) to the other (n−1) number of apparatuses via communication unit 230.

Regarding $j=\{1, \ldots, n\}\yen i$, key exchanging apparatus 200(i) waits for receiving contribution data y[j] from apparatus j by communication unit 230.

When contribution data y[j] is received by communication unit 230 from every apparatus, forming contribution data set 255 including all the contribution data y[j], verifiable auxiliary data generating unit 243 generates auxiliary data 254 ($x[i]=(y[i+1]/y[i-1])^{r[i]}$) from contribution data set 255 and contribution random number 245, and signing unit 244 generates signer contribution confirmation signature 253(sig) with respect to contribution data set 255 (sid, y[1], ..., y[n]) including every contribution data received from every counterpart apparatus by using secret key 205 and public key 204 input via input unit 210. Verifiable auxiliary data generating unit 243 verifies that x[i] has been properly created by using y[i+1], y[i−1], r[i] with a non-interactive zero knowledge by indicating only y[i+1], y[i−1], r[i], g. This certification sentence is assumed as an auxiliary data validity certification sentence 259 (proof[i]).

Communication unit 230 transmits (sid, proof[i], sig) to the other (n−1) number of apparatuses.

When auxiliary data x[j] is received by communication unit 230 from each apparatus, forming auxiliary data set 252 including all auxiliary data x[j], validity verifying unit 241 verifies each signature of contribution confirmation signature set 251 and each auxiliary data validity certification sentence (proof[j]) of auxiliary data validity certification sentence set 258 by using counterpart identifier set 201 and counterpart public key set 202 inputted via input unit 210, contribution confirmation signature set 251 including data received, by communication unit 230, which has been transferred from a different apparatus, and auxiliary data set 252.

Next, key generating unit 242 generates $k[i]=(y[i-1]^{r[i]})^n x[i]^{n-1} x[i+1]^{n-2} \ldots x[n]^{i-1} x[1]^{i-2} x[2]^{i-3} \ldots x[i-2]$ from *candidate* data set 255 and auxiliary set 252 received by *communication*.

Public key 208 (ak[i]=e(k[i], v)) is outputted from key generating unit 242 via output unit 220.

In the two exemplary embodiments as described above, the sentences of subjects, for which each apparatus generates a signature, are all the same. In this case, the amount of calculation required for verification can be reduced by using an aggregate signature.

Meanwhile, in the present invention, processing within the key exchanging apparatus is realized by the above-described dedicated hardware. Besides, a program for realizing the function may be recorded in a recording medium that can be recorded by the key exchanging apparatus, can be read by the key exchanging apparatus so as to be executed. The key exchanging apparatus-readable recording medium may be an HDD installed within the key exchanging apparatus in addition to a movable recording medium such as floppy disks, optical magnetic disks, DVDs, or CDs. The program recorded in the recording medium may be read and controlled by, for example, a control block to perform the processing as described above.

INDUSTRIAL AVAILABILITY

Key exchanging among a plurality of apparatuses can be effective for a case where many users hold a conference through a network. Participating members can be checked, and a secret key shared by the conference members can be previously determined by using the key exchanging apparatus according to the present invention in order to prevent someone else, not members, from participating in the conference or wiretapping content of the conference.

While the invention has been shown and described with reference to the exemplary embodiments and examples, it will be understood by those skilled in the art that the invention is not limited thereto and that various changes may be made thereto without departing from the spirit and scope of the invention as defined by the following claims.

This application claims the priority of Japanese Patent Application No. 2007-138940 filed on May 25, 2007, the disclosures of which are incorporated herein by reference.

What is claimed is:

1. A key exchanging apparatus which receives a public key, a secret key, an identifier, a counterpart public key set, a counterpart identifier set, a session number, and a random number inputted thereto, performs communication with a plurality of counterpart apparatuses identified by identifiers belonging to the counterpart identifier set, and generates and outputs a public key, the apparatus comprising:
a contribution random number generating unit that generates a contribution random number by using the random number;
a contribution data generating unit that generates contribution data from the contribution random number generated by the contribution random number generating unit;
a communication unit that transmits the contribution data to the plurality of counterpart apparatuses and receives contribution data from all of the counterpart apparatuses that participate in a key exchange with the key exchanging apparatus;
a signing unit that generates a signer contribution confirmation signature with respect to a contribution data set including all the contribution data received by the communication unit from the plurality of counterpart apparatuses participating in the key exchange by using the secret key and the public key;
a verifiable auxiliary data generating unit that generates auxiliary data and an auxiliary data validity certification sentence from the contribution data set and the contribution random number,
the auxiliary data, the auxiliary data validity certification sentence and the contribution confirmation signature being transmitted to the plurality of counterpart apparatuses by the communication unit;
a validity verifying unit that verifies validity of the auxiliary data by using the counterpart identifier set and the counterpart public key set, a contribution confirmation signature set, an auxiliary data set and an auxiliary data validity certification sentence set including data received by the communication unit from the plurality of counterpart apparatuses; and
a key generating unit that generates the public key from the contribution data set and the auxiliary data received by the communication unit from the plurality of counterpart apparatuses.

2. The apparatus of claim 1, further comprising:
a calculator configured to calculate two groups G and GT the orders of which are especially identical to each other and in which there is bilinear mapping from two elements belonging to the group G to the group GT,
wherein, especially, the contribution data and the auxiliary data are a source of group G,
the auxiliary data validity certification sentence is a null set, and
the validity verifying unit verifies that each auxiliary data has been properly generated by using the contribution data set, by calculating bilinear mapping upon receiving contribution data and auxiliary data.

3. The apparatus of claim 1, wherein the signing method used for generating the signature is an aggregate signature.

4. A key exchanging method in which a public key, a secret key, an identifier, a counterpart public key set, a counterpart identifier set, a session number and a random number are assigned, communication with a plurality of counterpart apparatuses identified by identifiers belonging to the counterpart identifier set is performed, and a public key is generated and outputted, the method comprising:
generating a contribution random number by using the random number;
generating contribution data from the contribution random number;
transmitting the contribution data to the plurality of counterpart apparatuses;
receiving contribution data from all of the counterpart apparatuses that participate in a key exchange with the key exchanging apparatus;
generating a signer contribution confirmation signature with respect to a contribution data set including all the contribution data received from the plurality of counterpart apparatuses participating in the key exchange by using the secret key and the public key;
generating auxiliary data and an auxiliary data validity certification sentence from the contribution data set and the contribution random number;
transmitting the auxiliary data, the auxiliary data validity certification sentence and the contribution confirmation signature to the plurality of counterpart apparatuses;
verifying validity of the auxiliary data by using the counterpart identifier set and the counterpart public key set, a contribution confirmation signature set, an auxiliary data set and an auxiliary data validity certification sentence set including data received from the plurality of counterpart apparatuses; and generating the public key by the contribution data set and the auxiliary data received from the plurality of counterpart apparatuses.

5. A non-transitory record medium storing a program for a key exchanging apparatus which receives a public key, a secret key, an identifier, a counterpart public key set, a counterpart identifier set, a session number, and a random number inputted thereto, performs communication with a plurality of counterpart apparatuses identified by identifiers belonging to the counterpart identifier set, and generates and outputs a public key, said program comprising:

the order of generating a contribution random number by using the random number;

the order of generating contribution data from the contribution random number;

the order of transmitting the contribution data to the plurality of counterpart apparatuses;

the order of receiving contribution data from all of the counterpart apparatuses that participate in a key exchange with the key exchanging apparatus;

the order of generating a signer contribution confirmation signature with respect to a contribution data set including all the contribution data received from the plurality of counterpart apparatuses participating in the key exchange by using the secret key and the public key;

the order of generating auxiliary data and an auxiliary data validity certification sentence by the contribution data set and the contribution random number, the order of transmitting the auxiliary data, the auxiliary data validity certification sentence, and the contribution confirmation signature to the plurality of counterpart apparatuses;

the order of verifying validity of the auxiliary data by using the counterpart identifier set and the counterpart public key set, a contribution confirmation signature set, a auxiliary data set and an auxiliary data validity certification sentence set including data received from the plurality of counterpart apparatuses; and the order of generating the public key from the contribution data set and the auxiliary data received from the plurality of counterpart apparatuses.

6. The apparatus of claim 2, wherein the signing method used for generating the signature is an aggregate signature.

* * * * *